United States Patent
Freen

(10) Patent No.: US 6,883,507 B2
(45) Date of Patent: Apr. 26, 2005

(54) SYSTEM AND METHOD FOR GENERATING AND SUSTAINING A CORONA ELECTRIC DISCHARGE FOR IGNITING A COMBUSTIBLE GASEOUS MIXTURE

(75) Inventor: Paul Douglas Freen, Titusville, FL (US)

(73) Assignee: Etatech, Inc., Titusville, FL (US)

( * ) Notice: Subject to any disclaimer, the term of this patent is extended or adjusted under 35 U.S.C. 154(b) by 38 days.

(21) Appl. No.: 10/336,746

(22) Filed: Jan. 6, 2003

(65) Prior Publication Data

US 2004/0129241 A1 Jul. 8, 2004

(51) Int. Cl.[7] .............................................. F02P 15/10
(52) U.S. Cl. ..................... 123/606; 123/143 B; 123/162
(58) Field of Search .......................... 123/143 B, 162, 123/606, 608

(56) References Cited

U.S. PATENT DOCUMENTS

| | | | |
|---|---|---|---|
| 2,617,841 A | * 11/1952 | Linder | .................... 123/143 B |
| 3,934,566 A | * 1/1976 | Ward | .................... 123/143 B |
| 4,114,685 A | 9/1978 | Schwartz et al. | |
| 4,219,001 A | 8/1980 | Kumagai et al. | |
| 4,284,054 A | 8/1981 | Kumagai et al. | |
| 4,332,219 A | 6/1982 | Gonzalez et al. | |
| 4,416,224 A | 11/1983 | Hobby et al. | |
| 4,446,826 A | * 5/1984 | Kimura et al. | .............. 123/606 |
| 4,480,595 A | 11/1984 | Hobby et al. | |
| 4,996,967 A | 3/1991 | Rosswurm et al. | |
| 5,154,153 A | 10/1992 | MacGregor et al. | |
| 5,179,928 A | 1/1993 | Cour et al. | |
| 5,361,737 A | 11/1994 | Smith et al. | |
| 5,503,133 A | 4/1996 | Trigger et al. | |
| 5,564,403 A | 10/1996 | Codina et al. | |
| 5,568,801 A | 10/1996 | Paterson et al. | |
| 5,590,629 A | 1/1997 | Codina et al. | |
| 5,649,507 A | 7/1997 | Gregoire et al. | |
| 5,705,892 A | 1/1998 | Codina et al. | |
| 5,711,283 A | 1/1998 | Trigger et al. | |
| 5,720,252 A | 2/1998 | Blodgett et al. | |
| 5,730,100 A | 3/1998 | Bergsten et al. | |
| 5,983,871 A | 11/1999 | Gordon et al. | |

OTHER PUBLICATIONS

L. Celona et al., "Ionization Efficiency Measurements with the Microwave Discharge Ion Source Midas", Proceedings of EPAC 2000, Vienna, Austria, pp. 1601–1603. (3 pages).

Guan Penghui et al., "Studies on an AC/DC Combination Discharge Mode for Nox Treatment", (4 pages) Eighth International Symposium on High Pressure Low Temperature Plasma Chemistry, Puhajarve, Estonia, Jul. 21–25, 2002.

Daniel M. Dobkin, "Effects of Operating Parameters on Capacitive Plasmas", http://www.batnet.com/enigmatics/semincond...\_Funadmentals/plasmas/Cap\_parameters.html, May 13, 2002. (4 pages).

Daniel M. Dobkin, "Capacitative Plasmas", http://www.batnet.com/enigmatics/semicond . . . \_nadmentals/plasmas/capacitative \_plasma.html, May 13, 2002. (2 pages).

(Continued)

Primary Examiner—Erick Solis
(74) Attorney, Agent, or Firm—Hunton & Williams

(57) ABSTRACT

The invention relates to a system for igniting a fuel-air mixture in a combustion chamber with a corona discharge. The system comprises an electrode inside of the combustion chamber, an electric circuit which provides radio frequency electric power to the electrode, and a ground formed by the combustion chamber walls. A radio frequency voltage differential formed between the electrode and the ground produces a radio frequency electric field therebetween which causes a fuel-air mixture to ionize resulting in combustion of the fuel-air mixture. The system can be utilized in engines such as internal combustion engines or gas turbine engines, for example.

43 Claims, 8 Drawing Sheets

OTHER PUBLICATIONS

Daniel M. Dobkin, "Hot and Cold", http://www.batnet.com/enigmatics/semicond . . . VD_Fundamentals/plasmas/plasma_intro.html, May 13, 2002. (1 page).

"Physics of Thin Films", http://www.uccs.edu/~tchriste/courses/PHYS549/549lectures/plasma.html, Oct. 16, 2002. (8 pages).

Thomas J. Bonazza et al., "RF Plasma Ignition System Concept for Lean Burn Internal Combustion Engines," Society of Automotive Engineers, Paper No. 929416, pp. 4.315–4.319 (1992).

International Search Report for PCT/US03/39932 mailed Jun. 4, 2004.

* cited by examiner

SYSTEM AND METHOD FOR GENERATING AND SUSTAINING A CORONA ELECTRIC DISCHARGE FOR IGNITING A COMBUSTIBLE GASEOUS MIXTURE

BACKGROUND OF THE INVENTION

The present invention relates to systems and methods for generating and sustaining a corona electric discharge for use in the ignition of fuel-air mixtures, such as in internal combustion engines or gas turbines.

Generally the combustion of the fuel-air mixture in an internal combustion engine ("ICE") or gas turbine has been initiated with a conventional spark ignition system. The spark ignition system generates an electric arc discharge in the fuel-air mixture. The arc discharge heats the immediately surrounding fuel-air mixture to an extremely high temperature causing electrons to escape from their nuclei and creating a relatively small region of highly ionized gas. The combustion reaction(s) are then commenced in this small region of ionized gas. If conditions are right, the exothermic combustion reaction(s) will heat the fuel-air mixture immediately surrounding the small region of ionized gas to cause further ionization and combustion. This chain reaction process produces first a flame kernel in the combustion chamber of the ICE or gas turbine and proceeds with a flame front moving through the combustion chamber until the fuel-air mixture is combusted.

In conventional spark ignition systems, the electric arc discharge is created when a high voltage DC electric potential is applied across two electrodes in the combustion chamber. Typically the electrodes, which in the case of an ICE are part of a spark plug, penetrate into the combustion chamber. A relatively short gap is present between the electrodes. The high voltage potential between the electrodes causes a strong electric field to develop between the electrodes. The strong electric field causes dielectric breakdown in the gas between the electrodes. The dielectric breakdown commences when seed electrons naturally present in the fuel-air gas are accelerated to a highly energetic level by the electric field. The seed electron is accelerated to such a high energy level that when it collides with another electron in the fuel-air gas, it knocks that electron free of its nucleus resulting in two lower energy level, free electrons and an ion. The two lower energy level free electrons are then in turn accelerated by the electric field to a high energy level and they, too, collide with and free other electrons in the fuel-air gas. If this chain reaction continues, the result is an electron avalanche where a large proportion of the fuel-air gas between the electrodes is ionized into charge carrying constituent particles (i.e., ions and electrons). With such a large proportion of the fuel-air gas ionized, the gas no longer has dielectric properties but acts rather as a conductor and is called a plasma. A high current passes through a thin, brilliantly lit column of the ionized fuel-air gas (i.e., the arc) from one electrode of the spark plug to the other until the charge built up in the ignition system is dissipated. Because the gas has undergone complete dielectric breakdown, when this high current flows there is a low voltage potential between the electrodes. The high current causes intense heating—up to 30,000° F.—of the fuel-air gas immediately surrounding the arc. It is this heat which sustains the ionization of the fuel-air mixture long enough to initiate combustion.

This method of initiating combustion with an electric arc discharge works reasonably well in many applications. However, there is a growing need for a different combustion initiation method which performs better than a conventional spark ignition system in demanding applications such as high air boost ICE engines and ICE engines that burn lean fuel-air mixtures. High air boost engines result in greater power output and higher efficiency. Lean fuel-air mixtures result in less pollutants discharged from the engine and higher efficiency. In these applications, the conventional spark ignition system may not perform at a level of reliability adequate to support widespread adoption.

In high air boost engines utilizing a conventional spark discharge ignition system, a greater voltage potential across the electrodes is necessary to produce the electric arc discharge because of the increased gas pressure (according to Paschen's Law). However, the maximum voltage potential at the electrodes may be limited by the dielectric strength of the insulating materials in the ignition system. If the dielectric strength of the ignition system is not sufficient, it cannot deliver the voltage potential to the electrodes to produce the arc. Even if the dielectric strength of the ignition system is sufficient to deliver the voltage potential to the electrodes and produce an arc, the increased voltage potential necessary in a high air boost engine results in greater electric energy being carried through the electrodes, an increased temperature of the electrodes, and an increased rate of electrode erosion. Electrode erosion increases the gap between the electrodes causing an even further increase in the voltage potential necessary to create an arc, and may eventually prevent the arc from being struck at all and cause misfire of the engine.

Lean fuel-air engines often operate in conjunction with high air boost levels, so conventional spark ignition systems perform problematically in many lean fuel-air engines for the same reasons explained above. Also, lean fuel-air mixtures typically require greater energy from the electric arc to effectively initiate combustion. But the maximum energy output of a conventional spark ignition system can be limited by the maximum voltage potential that can be delivered by the insulating materials in the ignition system, and can be limited by the maximum energy output possible through the electrodes before electrode erosion becomes a problem. In addition, in a lean burning engine utilizing a conventional spark ignition system, necessary heat transfer in the combustion chamber—from the electric arc to the surrounding fuel-air gas to commence combustion, and from the small flame kernel created by an electric arc to the flame front to sustain combustion—can be easily interrupted by heat loss due to turbulent gas flows, cold combustion chamber walls, etc. If the heat loss is too great, the combustion will not continue to completion.

In sum, heat is one of the drawbacks of conventional spark ignition systems, e.g., the electrode damaging heat produced by the electric arc, and the reliance upon heat transfer to initiate combustion in the flame kernel and sustain it through the flame front. Also, because of its reliance upon creating heat to ionize the fuel-air mixture, the maximum energy output of a conventional spark ignition system is limited by the amount of heat the electrodes can sustain.

SUMMARY OF THE INVENTION

This invention relates to a system and method which uses a corona-type electric discharge to directly ionize a fuel-air mixture. In the corona-type electric discharge, the electric field in the combustion chamber is controlled so that the fuel-air mixture does not undergo complete dielectric breakdown producing a high current electric arc. Rather, the electric field is maintained at a high level, but not high enough to cause complete dielectric breakdown. Once the fuel-air mixture is ionized to a sufficient level, a flame front will develop which can propagate throughout the combustion chamber.

One embodiment of the invention is an engine comprising a combustion chamber for containing a combustible gaseous mixture, an electrode, a power source which powers the electrode, a current sensor which measures a current in the power source, a voltage sensor which measures a voltage in the power source, and means for controlling a power level provided to the electrode based on the measured voltage and current to sustain a corona discharge between the electrode and the combustion chamber, wherein the corona discharge provides sufficient energy to ignite the combustible gaseous mixture.

Another embodiment of the invention is a method of igniting a combustible gaseous mixture in a combustion chamber comprising the steps of providing radio frequency power to an electrode such that a corona discharge is generated between the electrode and the combustion chamber, measuring a voltage and a current of a power source which powers the electrode, and controlling a power level provided to the electrode based on the measured voltage and current to sustain the corona discharge between the electrode and the combustion chamber, wherein the corona discharge provides sufficient energy to ignite the combustible gaseous mixture in the combustion chamber.

Another embodiment of the invention is an apparatus comprising an electrode adapted to be fixed within a combustion chamber and a circuit for providing radio frequency power having a frequency of between 30,000 and 3,000,000 hertz to the electrode in a manner such that the radio frequency power creates a corona discharge in a gas within the combustion chamber, and wherein the circuit maintains a current between the electrode and a ground such that an electric arc is not formed in the combustion chamber between the electrode and the ground.

DETAILED DESCRIPTION OF THE INVENTION

The principles of the invention will be explained by describing in detail a specific, exemplary embodiment of a corona-type electric discharge ignition system and its method of operation. However, those skilled in the art will understand that the principles of the invention can be used in other apparatuses or processes. The scope of the invention is not intended to be limited by the details of this exemplary embodiment of the invention. The scope of the invention should be determined through a study of the appended claims.

Figure 1:
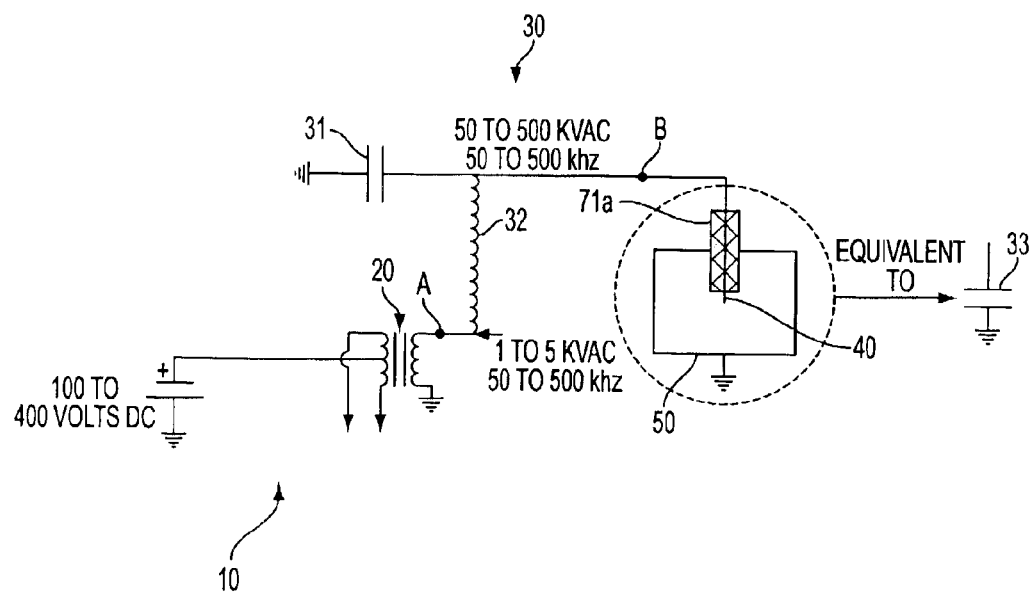
FIG. 1 is a schematic diagram of a corona discharge ignition system with the electrode directly coupled to the combustion chamber according to an exemplary embodiment of the invention.

FIG. 1 illustrates an ignition system according to an exemplary embodiment of the invention. The following discussion will describe the ignition system in the context of an ICE. However, those skilled in the art will appreciate that the ignition system can be utilized in other types of engines, such as gas turbine engines, for example. According to an exemplary method used to initiate combustion, an electrode is charged to a high, radio frequency ("RF") voltage potential to create a strong RF electric field in the combustion chamber. The strong electric field in turn causes a portion of the fuel-air mixture in the combustion chamber to ionize. The process of ionizing the fuel-air gas can be the commencement of dielectric breakdown. But the electric field can be dynamically controlled so that the dielectric breakdown does not proceed to the level of an electron avalanche which would result in a plasma being formed and an electric arc being struck from the electrode to the grounded cylinder walls or piston. The electric field is maintained at a level where only a portion of the fuel-air gas is ionized—a portion insufficient to create the electron avalanche chain reaction described previously which results in a plasma. However, the electric field is maintained sufficiently strong so that a corona discharge occurs. In a corona discharge, some electric charge on the electrode is dissipated through being carried through the gas to the ground as a small electric current, or through electrons being released from or absorbed into the electrodes from the ionized fuel-air mixture, but the current is very small and the voltage potential at the electrode remains very high in comparison to an arc discharge. The sufficiently strong electric field causes ionization of a portion of the fuel-air mixture to facilitate the combustion reaction(s). The ionized fuel-air mixture forms a flame front which then becomes self-sustaining and combusts the remaining fuel-air mixture.

FIG. 1 is a schematic diagram of components of an exemplary corona discharge ignition system. The ignition system includes a low voltage circuit 10 coupled across a radio frequency step-up transformer 20 to a high voltage circuit 30, which is in turn coupled to an electrode 40 which is inside the combustion chamber 50.

The low voltage circuit 10 may be a 100 to 400V DC circuit, for example. The 100 to 400V electric potential can be conventionally produced using one or more step-up transformers connected to the engine's 12V or 24V DC power system. The voltage and/or current of the low voltage circuit 10 can be controlled by a control system, as will be described in further detail below. The low voltage circuit 10 feeds an RF step-up transformer 20 which has an output of 1 to 5 KVAC at 50 to 500 kHz, for example.

The RF step-up transformer 20 drives a high voltage circuit 30. The high voltage circuit 30 may include one or more inductive elements 32, for example. The inductive element 32 may have an associated capacitance, which is represented as element 31 in FIG. 1. In addition, the wiring, electrode 40, feedthru insulator 71a and ground may have an associated capacitance which is illustrated as element 33 in FIG. 1. Together, the inductive element 32, the capacitance 31, and the capacitance 33 form a series LC circuit having an associated resonant frequency. The capacitive elements 31, 33 and the inductive element 32 illustrated in FIG. 1 are merely representative of possible architectures. As will be appreciated by those skilled in the art, a number of different architectures could be used for producing high voltages in the radio frequency range. In one example, the high voltage circuit 30 includes a 7.5 millihenry inductor 32 and an equivalent series capacitance (31 and 33) of 26 picofarads. The resonant frequency for this example is 360 kilohertz. The output frequency of the RF step-up transformer 20 is matched to the resonant frequency of the high voltage circuit 30. Thus, when the RF step-up transformer 20, with an output of 1 to 5 KVAC for example, drives the high voltage circuit 30 at its resonant frequency, the high voltage circuit becomes excited resulting in a substantial increase in the voltage potential, e.g., to 50 to 500 KVAC, at the output (point B) of the high voltage circuit. The voltages and frequencies of the low voltage circuit 10 and the high voltage circuit 30 stated above are merely exemplary. These voltages and frequencies may be chosen according to the requirements of the particular ignition system application. Typically, the frequency of the RF power supplied to the electrode will be between 30,000 and 3,000,000 hertz.

The high voltage circuit 30 powers an electrode 40 which projects into the combustion chamber 50. The electrode 40 is connected to the output of the high voltage circuit 30. The walls of the combustion chamber 50 are grounded with respect to the electrode 40. In the schematic in FIG. 1, a circle has been drawn around the electrode 40 and the combustion chamber 50 and represents that the components in the circle are equivalent to a capacitor connected to ground in the electrical circuit. The combustion chamber 50 and the electrode 40 form the equivalent of two plates of a conventional capacitor separated by the dielectrics of the feedthru insulator 71a, and the fuel-air gas in the combustion chamber 50. This capacitance stores electric field energy.

The electrode 40 could be positioned differently than illustrated in FIG. 1 and still be inside the combustion chamber. By "inside the combustion chamber" is meant that when the circuit is charged, the electric field is formed inside the combustion chamber, e.g., between the electrode and the combustion chamber walls.

Figure 3:
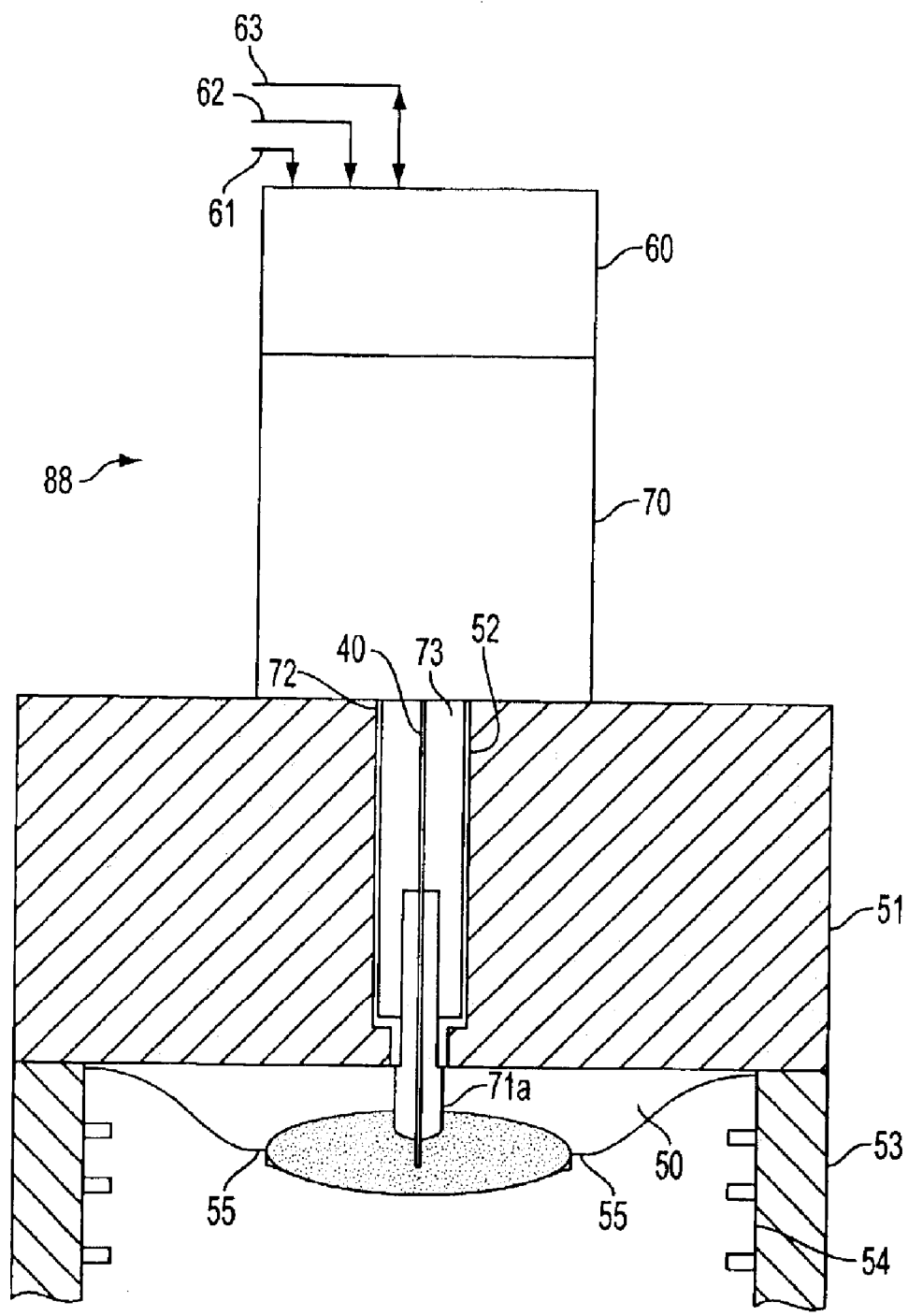
FIG. 3 is a schematic diagram showing an example of the components of the corona discharge combustion system of FIG. 1 situated in an internal combustion engine.

A "direct coupled" RF corona discharge ignition system is illustrated in FIGS. 1 and 3. The system is "direct coupled" because the electrode 40 is placed directly in the fuel-air mixture in the combustion chamber 50, i.e., the electrode extends through the feedthru insulator 71a and is directly exposed to the fuel-air mixture. This system can efficiently produce a strong electric field, but the performance of the electrode 40 may deteriorate over time because of its direct exposure to the combustion chamber environment.

Figure 2:
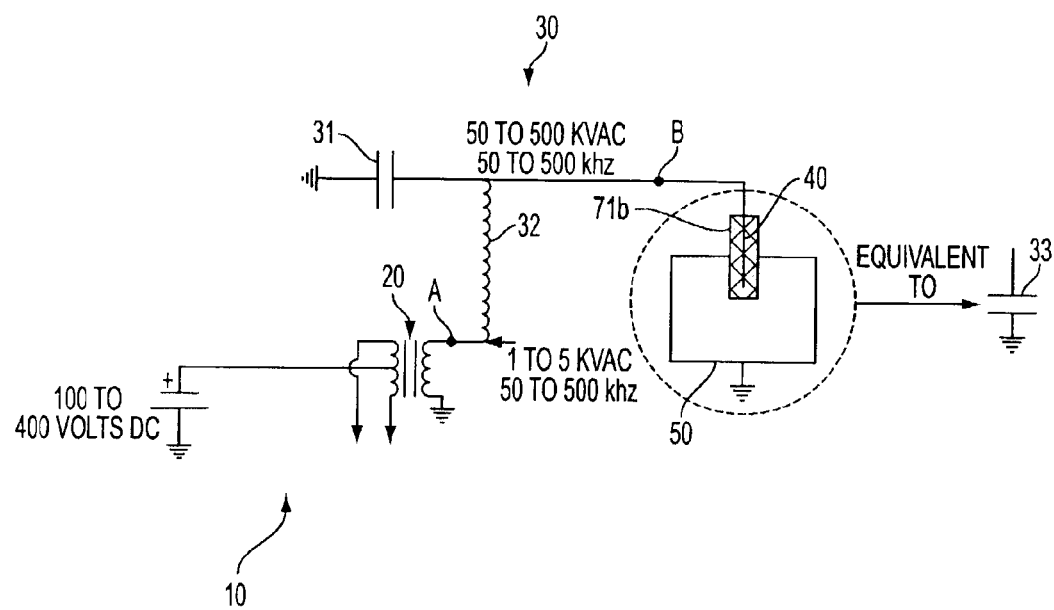
FIG. 2 is a schematic diagram of a corona discharge ignition system with the electrode capacitively coupled to the combustion chamber according to an exemplary embodiment of the invention.

A "capacitively coupled" RF corona discharge ignition system is illustrated in FIG. 2. This system is "capacitively coupled" because the electrode 40 does not extend out of the surrounding dielectric material of the feedthru insulator 71b to be directly exposed to the fuel-air mixture. Rather, the electrode 40 remains shrouded by the feedthru insulator 71b and depends upon the electric field of the electrode passing through part of the feedthru insulator to produce the electric field in the combustion chamber 50. In other respects, the capacitively coupled system in FIG. 2 can be the same as the direct coupled system of FIGS. 1 and 3. The electrode 40 in FIG. 2 is still considered to be inside the combustion chamber 50 even though it is not directly exposed to the fuel-air mixture. While this capacitively coupled system may not produce an electric field in the combustion chamber 50 as efficiently as the directly coupled system because the electrode 40 is not directly exposed to the combustion chamber, the electrode also may not deteriorate as quickly over time because it is protected.

FIG. 3 is a schematic, sectional view of a corona discharge ignition system which is exemplary of how the components of the system can be packaged together in a relatively small volume and attached to an ICE. The corona discharge ignition system may work well with existing ICEs with little modification of the basic structure of the engine. Typically, existing ICEs have a cylinder with a reciprocating piston received in the cylinder. A combustion chamber is formed between the cylinder walls and the piston. A fuel-air mixture is introduced into the combustion chamber and is ignited. The piston is driven by the pressurized combustion gases. In a typical ICE, a spark plug socket permits a spark plug to be attached to the engine so that the electrodes of the spark plug are in communication with the combustion chamber.

In the embodiment in FIG. 3, a control electronics and primary coil unit 60 may receive as inputs a timing signal 61, a low voltage DC power source 62, e.g. 150 volts DC, and control information 63. An output of the control electronics and primary coil unit 60 may be diagnostic information 63 about the ignition system's performance. The RF step-up transformer 20 of FIG. 1 is contained in the control electronics and primary coil unit 60. A secondary coil unit 70 is adjacent the control electronics and primary coil unit 60 and the engine's cylinder head 51. The capacitive and inductive element(s) 31 and 32 of the high voltage circuit 30 of FIG. 1 are contained in the secondary coil unit 70.

FIG. 3 also shows the feedthru insulator 71a which may be formed of boron nitride, for example. The feedthru insulator 71a surrounds the electrode 40 as it passes through the cylinder head 51 into the combustion chamber 50. The cylinder head 51, cylinder walls 53, and piston 54 are grounded with respect to the electrode 40. The feedthru insulator 71a is fixed in an electrode housing 72 which may be a metal cylinder, for example. The space 73 between the electrode housing 72 and the electrode 40 may be filled with a dielectric gas such as sulfur hexafluoride ($SF_6$) or compressed air, for example. The control electronics and primary coil unit 60, secondary coil unit 70, electrode housing 72, electrode 40 and feedthru insulator 71a together form an ignitor 88 which may be inserted into the space 52 in the cylinder head 51. For example, the smaller diameter portion of the electrode housing 72 shown in FIG. 3 may have threads which cooperate with corresponding threads in the cylinder head 51 such that the ignitor 88 can be screwed into the cylinder head 51.

Figure 4:
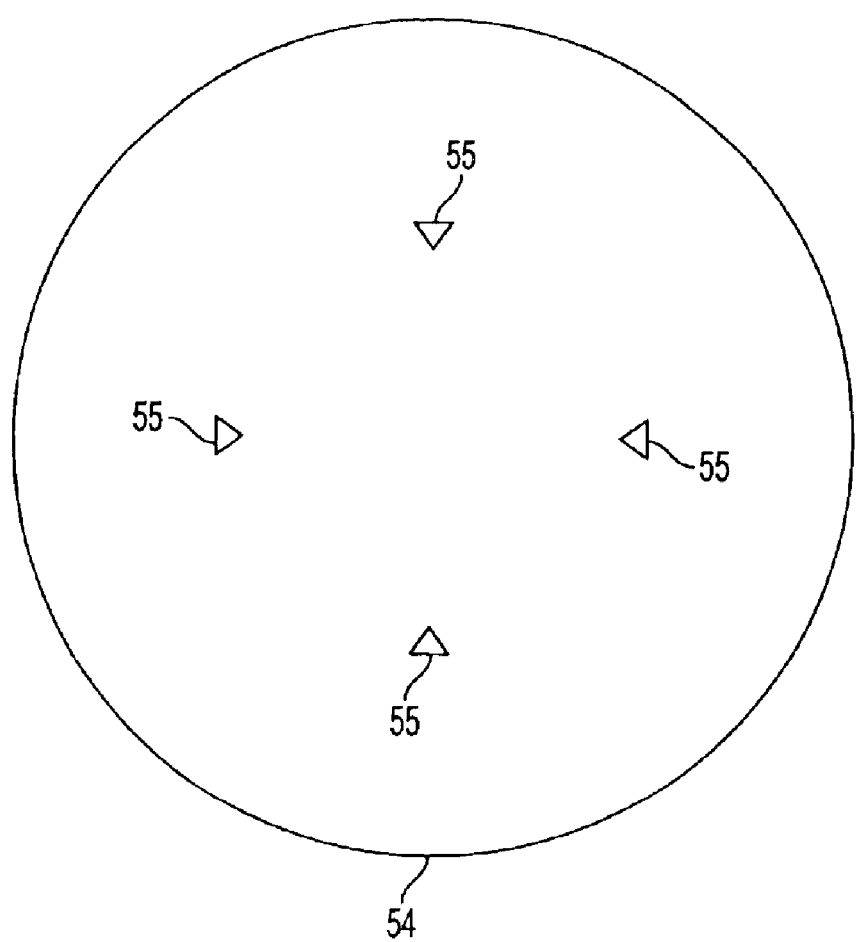
FIG. 4 is a diagram of field intensifiers distributed on the head of the piston in FIG. 3 according to an exemplary embodiment of the invention.

The combustion chamber 50 can be designed to focus the area of greatest electric field strength. According to one example, field intensifiers 55 comprising relatively sharp protrusions extending from the head of the piston 54 act to focus the electric field into the shaded area in FIG. 3 located between the field intensifiers 55 and the electrode 40. FIG. 4 is a top view of the piston 54 showing the field intensifiers 55. According to another embodiment, a number of protrusions can be included on the electrode 40 to focus the area of greatest electric field strength. For example, the electrode may include four protrusions which extend radially outwardly from the electrode toward the walls of the combustion chamber. The protrusions serve substantially the same function as the field intensifiers, e.g., to direct the electric field created between the electrode and the grounded combustion chamber.

Because the electric field is spread out across a relatively large volume in the combustion chamber 50 (even when the field is somewhat focused, as it is in FIG. 3), the resultant flame front is larger than the flame kernel which results from a conventional spark ignition system. The larger flame front can assist in combusting lean fuel-air mixtures which, due to turbulence and other factors, may have a heterogeneous fuel-air mixture containing regions that are difficult to ignite.

A control system may be provided to control the low voltage circuit, for example, so that the ignition system fires at the correct time and so that the electric discharge does not cause complete dielectric breakdown and form a plasma and an electric arc in the combustion chamber 50. The control system can fire the ignition system at a predetermined time (e.g., 10° before top dead center) for a predetermined duration (e.g., 1 to 2 milliseconds). The control system may be designed to sustain the corona discharge for any desired duration. For example, the control system may be designed to sustain the corona discharge for 1–2 milliseconds or other desired duration during each ignition cycle. The energy provided by the corona discharge in each ignition cycle is sufficient to ignite the fuel-air mixture in the combustion chamber.

The control system may also include the ability to dynamically select the time at which the ignition system will fire, the duration of the firing, and also the number of firings per ignition cycle in order to achieve or optimize goals such as power output, emissions, and/or efficiency. Ultimately, control of the ignition system firing is intended to affect the way that the fuel-air mixture combusts to achieve or optimize end goals such as power output, emissions, or efficiency. The corona discharge ignition system may provide better opportunities to control the combustion of the fuel-air mixture and therefore may provide improved power output, emissions, or efficiency with respect to a conventional spark ignition system. With the corona discharge ignition system, the possible range of control may be significantly greater because of the ability to introduce ionizing energy into the combustion chamber at a rate which may be significantly higher than a conventional spark ignition system, and because of the ability to introduce a much greater total amount of ionizing energy per power stroke into the combustion chamber.

Figure 5:
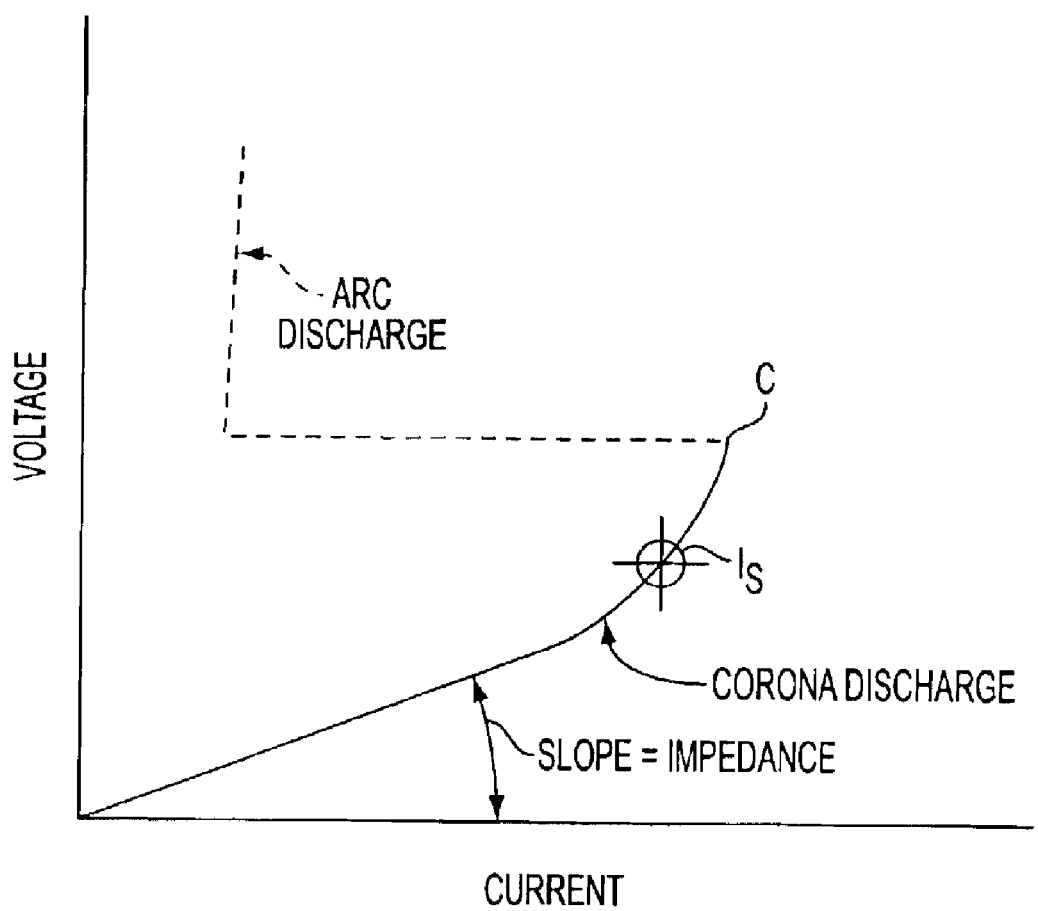
FIG. 5 is a graph of the input characteristics of a high voltage circuit of a corona discharge ignition system according to an exemplary embodiment of the invention.
Figure 6:
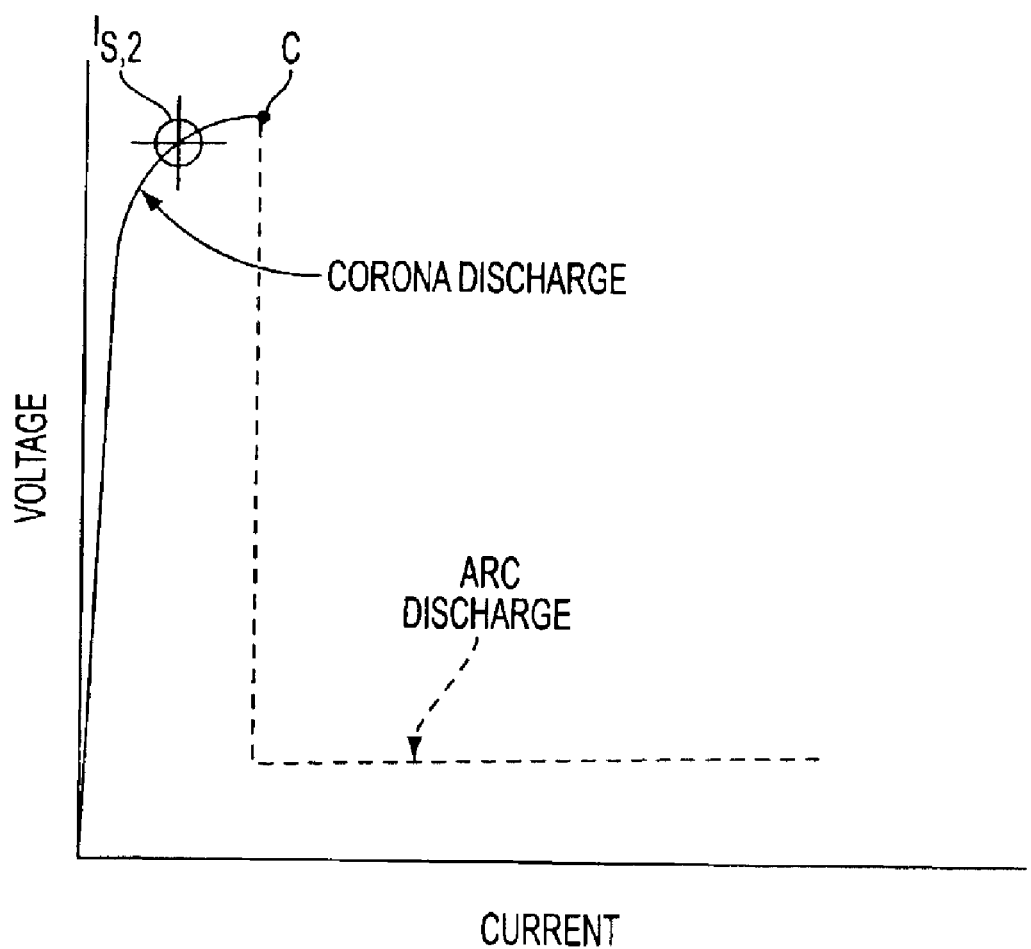
FIG. 6 is a graph of the output characteristics of a high voltage circuit of a corona discharge ignition system according to an exemplary embodiment of the invention.

FIGS. 5 and 6 provide an illustration of one way in which the corona electric discharge may be controlled to avoid an arc discharge. FIG. 5 illustrates hypothetical, idealized input characteristics of the high voltage circuit 30 measured at point A in FIG. 1. FIG. 6 illustrates hypothetical, idealized output characteristics of the high voltage circuit 30 to the electrode 40 measured at point B in FIG. 1. FIG. 6 is also a useful illustration of the difference between the characteristics of a corona electric discharge and an arc electric discharge. Beginning at the origin of the voltage and current graph of FIG. 6, as the voltage potential at the electrode 40 increases, the current increases at a comparatively slow rate. This is due to the dielectric properties of the fuel-air gas. As the voltage is increased and reaches a relatively high voltage potential, the rate of the current rise increases. This is evident from the decrease in the slope of the voltage-current trace. Dielectric breakdown of the fuel-air gas has begun and corona discharge occurs in this transition stage. If the voltage were increased even further, the fuel-air gas would undergo complete dielectric breakdown (approximately at point C in the graph of FIG. 6) and a plasma would be formed in the fuel-air gas. The plasma would carry charge easily, so while the plasma is sustained the voltage potential would be greatly reduced and the current would pass relatively freely through an electric arc. According to exemplary embodiments of the present invention, the ignition system is controlled so that the output does not extend into the dotted line region of the chart in FIG. 6.

The input characteristics of the high voltage circuit 30 shown in FIG. 5 are nearly the opposite of its output characteristics shown in FIG. 6. As the electric potential of the electrode 40 increases (before an arc is struck) and the output voltage rises, the input current increases in order to produce the high output voltage. The voltage at the input rises as the current rises, and the voltage divided by the current represents the impedance. The impedance is nearly constant for low voltages. In the transition stage at which the corona discharge occurs, the voltage begins to rise more quickly with the current and the impedance increases. If an arc were to be struck at the electrode 40, the input current would drop dramatically. According to exemplary embodiments of the present invention, the ignition system is controlled so that the input does not extend into the dotted line region of the chart in FIG. 5.

To regulate the electric discharge in order to generate and sustain a corona-type electric discharge, an impedance setpoint $I_s$ (see FIG. 5) of the high voltage circuit input can be selected. This impedance setpoint determines the character of the electric discharge. The higher the impedance setpoint, the greater the ionization power will be until arc discharge occurs. The actual impedance $I_a$ can be measured and compared with impedance setpoint $I_s$. The power input for the low voltage circuit 10 can then be regulated using pulse width modulation, for example, to cause the actual impedance $I_a$ to be at or near the impedance setpoint $I_s$.

Figure 7:
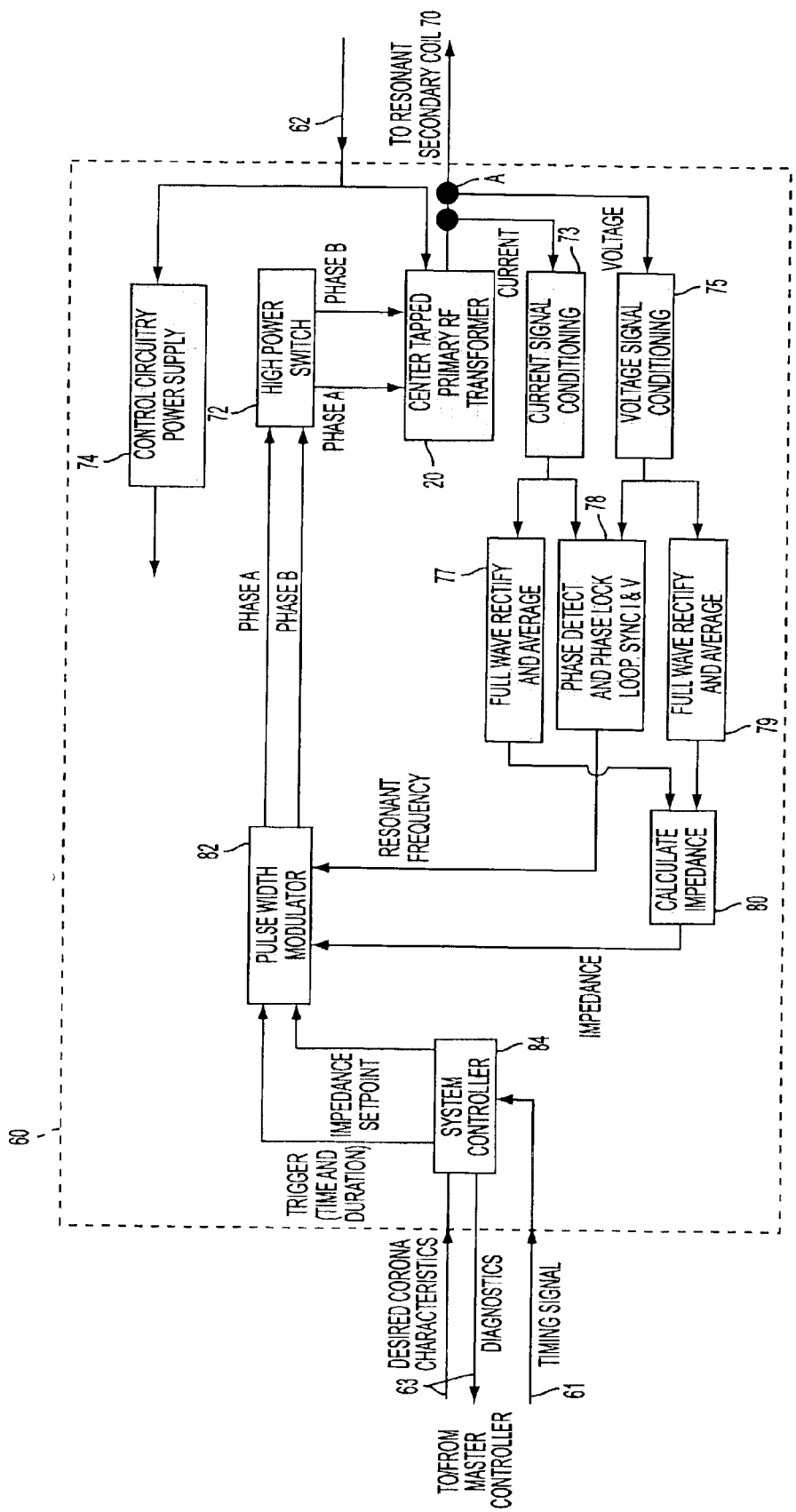
FIG. 7 is a block diagram of the control electronics and primary coil unit 60 of FIG. 3.

FIG. 7 is a functional block diagram of the control electronics and primary coil unit 60 according to an exemplary embodiment of the invention. As shown in FIG. 7, the control electronics and primary coil unit 60 includes a center tapped primary RF transformer 20 which receives via line 62 a voltage of 150 volts, for example, from the DC source. A high power switch 72 is provided to switch the power applied to the transformer 20 between two phases, phase A and phase B at a desired frequency, e.g., the resonant frequency of the high voltage circuit 30 (see FIG. 2). The 150 volt DC source is also connected to a power supply 74 for the control circuitry in the control electronics and primary coil unit 60. The control circuitry power supply 74 typically includes a step down transformer to reduce the 150 volt DC source down to a level acceptable for control electronics, e.g., 5–12 volts. The output from the transformer 20, depicted at "A" in FIGS. 2 and 7, is used to power the high voltage circuit 30 which is housed in the secondary coil unit 70 (see FIG. 3), according to an exemplary embodiment of the invention.

The current and voltage output from the transformer 20 are detected at point A and conventional signal conditioning is performed at 73 and 75, respectively, e.g., to remove noise from the signals. This signal conditioning may include active, passive or digital, low pass and band-pass filters, for example. The current and voltage signals are then full wave rectified and averaged at 77, 79, respectively. The averaging of the voltage and current, which removes signal noise, may be accomplished with conventional analog or digital circuits. The averaged and rectified current and voltage signals are sent to a divider 80 which calculates the actual impedance by dividing the voltage by the current. The current and voltage signals are also sent to a phase detector and phase locked loop (PLL) 78 which outputs a frequency which is the resonant frequency for the high voltage circuit 30. The PLL determines the resonant frequency by adjusting its output frequency so that the voltage and current are in phase. For series resonant circuits, when excited at resonance, voltage and current are in phase.

The calculated impedance and the resonant frequency are sent to a pulse width modulator 82 which outputs two pulse signals, phase A and phase B, each having a calculated duty cycle, to drive the transformer 20. The frequencies of the pulse signals are based on the resonant frequency received from the PLL 78. The duty cycles are based on the impedance received from the divider 80 and also on an impedance setpoint received from a system controller 84. The pulse width modulator 82 adjusts the duty cycles of the two pulse signals to cause the measured impedance from the divider 80 to match the impedance setpoint received from the system controller 84.

Figure 8:
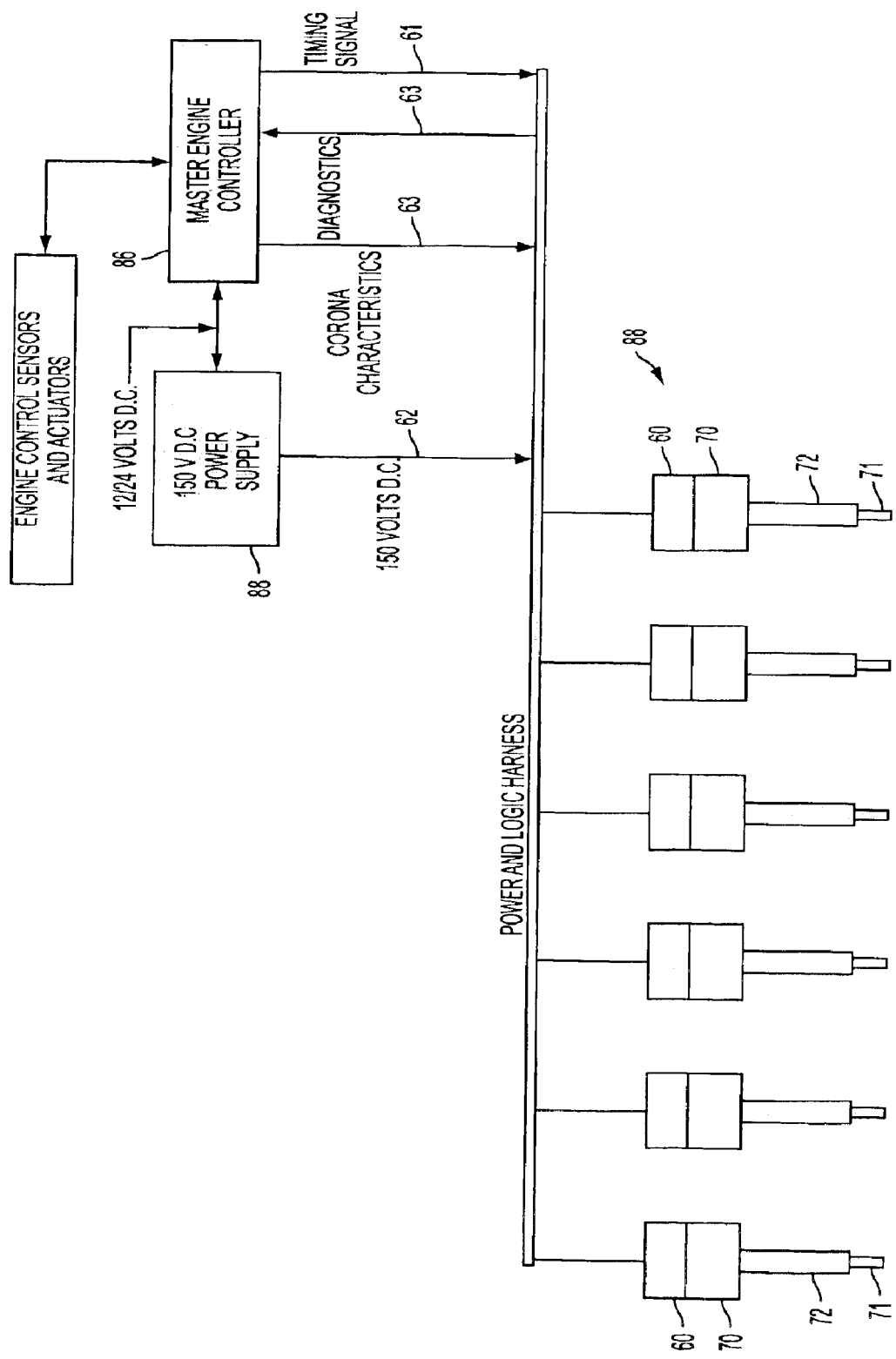
FIG. 8 is a diagram of a master engine controller connected to a number of ignitors according to an exemplary embodiment of the invention.

The system controller 84, in addition to outputting the impedance setpoint, also sends a trigger signal pulse to the pulse width modulator 82. This trigger signal pulse controls the activation timing of the transformer 20 which controls the activation of the high voltage circuit 30 and electrode 40 shown in FIG. 2. The trigger signal pulse is based on the timing signal 61 received from the master engine controller 86, which is shown in FIG. 8. The timing signal 61 determines when to start the ignition sequence. The system controller 84 receives this timing signal 61 and then sends the appropriate sequence of trigger pulses and impedance setpoint to the pulse width modulator 82. This information tells the pulse width modulator when to fire, how many times to fire, how long to fire, and the impedance setpoint. The desired corona characteristics (e.g., ignition sequence and impedance setpoint) may be hard coded in the system controller 84 or this information can be sent to the system controller 84 through signal 63 from the master engine controller 86. The system controller 84 may send diagnostics information to the master engine controller 86, as is customary in modern engine controls and ignition systems. Examples of diagnostic information may include under/over voltage supply, failure to fire as determined from the current and voltage signals, etc.

Referring to FIG. 8, the master engine controller 86 is shown with the various timing, diagnostics, and corona characteristics signals. Typically, the master engine controller 86 is also in communication with one or more engine control sensors, such as temperature and pressure sensors or a tachometer, and one or more actuators such as fuel injectors or a throttle. Also shown is the DC power supply 88, which may receive a 12/24 volt input and step up the voltage to 150 volts DC, for example with conventional switching power supply techniques.

The impedance setpoint $I_s$, rather than being determined by the system controller 84, may be determined by the master engine controller 86, according to one embodiment of the invention. The master engine controller 86 may determine the corona discharge characteristics, including, for example, impedance setpoint, number of discharges per firing sequence, and firing duration, based upon the engine's operating condition, including diagnostic information 63 from the ignition system. A map system correlating the desired corona discharge characteristics with various parameters such as throttle position, engine speed, load, and knock detection may be empirically established for a given engine and built into the master engine controller 86 so that the corona discharge characteristics are dynamically set according to the map while the engine runs. The desired corona discharge characteristics may also be determined by the master engine controller 86 based upon closed-loop feedback information such as exhaust emissions, engine power, cylinder pressure, etc.

The various signals and DC power are connected to a number of ignitors 88 through a power and logic harness. In FIG. 8, six ignitors are shown, one per cylinder. Each ignitor 88 includes a control electronics and primary coil unit 60, a secondary coil unit 70, an electrode housings 72, and a feedthru insulator 71. Each ignitor may have the structure shown in FIG. 3, for example.

As will be appreciated by those skilled in the art, the control system may be configured in other ways to control the characteristics and timing of the corona discharge. For example, the power input for the low voltage circuit 10 can be regulated using voltage control or current control techniques. The electric discharge can be regulated by dynamically adjusting the driving frequency of the RF step-up transformer 20 or the resonant frequency of the high voltage circuit 30. It is also possible to regulate the electric discharge by dynamically changing the characteristics of the high voltage circuit 30.

It is also possible to control the corona discharge based on the impedance at the output (as opposed to the input) of the high voltage circuit 30. In this case, appropriate components are provided to measure the actual impedance at the output of the high voltage circuit 30 and to select an impedance setpoint $I_{s,2}$ (see FIG. 6) to compare with the actual output impedance $I_{a,2}$. The master engine controller 86 may be configured as described above to determine the desired corona characteristics based upon mapping or closed loop feedback control, for example.

A test of an exemplary corona discharge ignition system has been performed in a combustion bomb. The combustion bomb contained propane and air at near standard temperature and pressure. The air to fuel ratio was lean at 31.25:1. This air to fuel ratio results in an excess air ratio of 2 in a propane/air mixture. The corona discharge was controlled so as to not cause complete dielectric breakdown of the fuel-air mixture. The high voltage circuit resonated at approximately 350 kHz. A total discharge of 1,007 millijoules was delivered to the combustion bomb. Under these conditions, the corona discharge system effectively ignited the fuel-air mixture in the combustion bomb. In a similar test also performed at near standard temperature and pressure, a conventional spark ignition system was unable to ignite the fuel-air mixture.

The discussion above has focused primarily on the use of an embodiment of the invention in igniting fuel-air mixtures in a piston driven ICE. The invention may also be used to ignite fuel-air mixtures in other engines including, gasoline, propane, natural gas, stationary, or nonstationary ICEs, as well as in auto ignition-type ICEs such as diesel engines. The invention can also be used to control or enhance the combustion reactions in a gas turbine.

I claim:

1. A system for igniting a fuel-air mixture in a combustion chamber having combustion chamber walls, the system comprising:

an electrode inside of the combustion chamber;

an electric circuit delivering radio frequency electric power at a frequency of between 30,000 and 3,000,000 hertz to the electrode;

a ground formed at least in part by the combustion chamber walls; and means for controlling an output of the electric circuit to the electrode so that complete dielectric breakdown does not occur and so that an electric arc is not struck in the combustion chamber;

wherein a radio frequency voltage differential formed between the electrode and the ground produces a radio frequency electric field therebetween which causes a fuel-air mixture to ionize resulting in combustion of the fuel-air mixture.

2. The system of claim 1, wherein the combustion chamber walls are formed by a cylinder and a reciprocating piston received in the cylinder that is driven by expanding combustion gases in the combustion chamber.

3. The system of claim 1, wherein the combustion chamber is adapted for use in a gas turbine.

4. The system of claim 1, wherein the electric circuit comprises a low voltage circuit and a high voltage circuit, the low voltage circuit driving the high voltage circuit through a radio frequency step-up transformer, the high voltage circuit having a resonant frequency and the low voltage circuit driving the high voltage circuit at or near its resonant frequency, the electrode being connected to an output of the high voltage circuit.

5. The system of claim 1, wherein the electrode is directly exposed to an interior of the combustion chamber.

6. The system of claim 1, wherein the electrode is surrounded by a dielectric material inside the combustion chamber.

7. The system of claim 2, wherein the piston comprises means for directing the radio frequency electric field.

8. The system of claim 1, wherein the electrode comprises a plurality of protrusions which direct the radio frequency electric field.

9. A system for igniting a fuel-air mixture in a combustion chamber having combustion chamber walls, the system comprising:

an electrode inside of the combustion chamber;

an electric circuit delivering radio frequency electric power at a frequency of between 30,000 and 3,000,000 hertz to the electrode;

a ground formed at least in part by the combustion chamber walls; and means for controlling an output of the electric circuit to the electrode so that complete dielectric breakdown does not occur and so that an electric arc is not struck in the combustion chamber;

wherein a radio frequency voltage differential formed between the electrode and the ground produces a radio frequency electric field therebetween which causes a fuel-air mixture to ionize resulting in combustion of the fuel-air mixture; and wherein the electric circuit comprises a low voltage circuit and a high voltage circuit, the low voltage circuit driving the high voltage circuit through a radio frequency step-up transformer, the high voltage circuit having a resonant frequency and the low voltage circuit driving the high voltage circuit at or near its resonant frequency, the electrode being connected to an output of the high voltage circuit; and wherein the means for controlling the output of the electric circuit to the electrode measures an actual impedance in the electrical circuit and compares the actual impedance to a setpoint impedance.

10. The system of claim 9, wherein the means for controlling the output of the electric circuit to the electrode adjusts the power output of the high voltage circuit so that the actual impedance substantially corresponds to the setpoint impedance.

11. The system of claim 10 wherein the means for controlling the output of the electric circuit to the electrode adjusts the power output of the high voltage circuit by using pulse width modulation to adjust the power output from the low voltage circuit.

12. An apparatus comprising:

an electrode adapted to be fixed within a combustion chamber; and a circuit for providing radio frequency power having a frequency of between 30,000 and 3,000,000 hertz to the electrode in a manner such that the radio frequency power creates a corona discharge in a gas within the combustion chamber, and wherein the circuit maintains a current between the electrode and a ground such that an electric arc is not formed in the combustion chamber between the electrode and the ground.

13. A method of igniting a combustible gaseous mixture in a combustion chamber comprising:

discharging electric energy through an electrode with a corona discharge into a combustion chamber filled with combustible gaseous mixture;

causing the combustible gaseous mixture to ionize due to the corona discharge to a sufficient level of ionization that the ionized combustible gaseous mixture commences a self-sustaining combustion reaction that combusts the combustible gaseous mixture in the combustion chamber;

measuring an actual impedance of a circuit that provides power to the electrode;

comparing the actual impedance with a setpoint impedance; and controlling a rate of discharge of electric energy through the electrode to cause the actual impedance to substantially match the setpoint impedance such that a plasma is not created and an electric arc is not struck in the combustion chamber.

14. The method of claim 13, wherein the step of discharging electric energy into the combustion chamber filled with the combustible gaseous mixture comprises generating a radio frequency electric field in the combustion chamber.

15. The method of claim 13, wherein the electrode is powered by a high voltage circuit, and the high voltage circuit is powered by a low voltage circuit, the high voltage circuit having a resonant frequency, and the low voltage circuit powering the high voltage circuit through an RE step-up transformer that drives the high voltage circuit at or near its resonant frequency so that the high voltage circuit resonates, the electrode being connected to an output of the high voltage circuit.

16. The method of claim 14, wherein the radio frequency electric field is generated between the electrode and field intensifiers formed in the combustion chamber, the field intensifiers acting to focus the strength of the electric field.

17. The method of claim 15, wherein the impedance is measured at the input of the high voltage circuit.

18. The method of claim 15, wherein the step of controlling the rate of discharge comprises adjusting the power output of the low voltage circuit using pulse width modulation.

19. The method of claim 13, wherein the electrode is capacitively coupled to the combustion chamber.

20. The method of claim 13, wherein the electrode is directly coupled to the combustion chamber.

21. The method of claim 13, wherein the combustion chamber is adapted for use in an internal combustion engine.

22. The method of claim 13, wherein the combustion chamber is adapted for use in a gas turbine engine.

23. A method of igniting a combustible gaseous mixture in a combustion chamber comprising the steps of:

provided radio frequency power to an electrode such that a corona discharge is generated between the electrode and the combustion chamber;

measuring a voltage and a current of a power source which powers the electrode; and controlling a power level provided to the electrode based on the measured voltage and current to sustain the corona discharge between the electrode and the combustion chamber, wherein the corona discharge provides sufficient energy to ignite the combustible gaseous mixture in the combustion chamber.

24. The method of claim 23, wherein the radio frequency power has a frequency of between 30,000 and 3,000,000 hertz.

25. The method of claim 23, further comprising the step of sustaining the corona discharge for a predetermined duration.

26. The method of claim 25, wherein the predetermined duration is at least one millisecond.

27. The method of claim 23, wherein the step of controlling the power level provided to the electrode comprises modulating a pulse width of a signal output from the power source.

28. The method of claim 23, wherein the power source powers an LC circuit which resonates to power the electrode.

29. The method of claim 28, wherein the step of controlling the power level provided to the electrode comprises controlling a frequency of a signal which drives the LC circuit.

30. The method of claim 28, wherein the step of controlling the power level provided to the electrode comprises controlling at least one component value of a component in the LC circuit.

31. The method of claim 23, wherein the combustion chamber is part of an internal combustion engine.

32. The method of claim 23, wherein the combustion chamber is part of a gas turbine engine.

33. A method of igniting a combustible gaseous mixture in a combustion chamber comprising the steps of:

providing radio frequency power to an electrode such that a corona discharge is generated between the electrode and the combustion chamber;

measuring a voltage and a current of a power source which powers the electrode; and controlling a power level provided to the electrode based on the measured voltage and current to sustain the corona discharge between the electrode and the combustion chamber, wherein the corona discharge provides sufficient energy to ignite the combustible gaseous mixture in the combustion chamber;

wherein the power level provided to the electrode is controlled to prevent a plasma arc from forming between the electrode and the combustion chamber.

34. A method of igniting a combustible gaseous mixture in a combustion chamber comprising the steps of:

providing radio frequency power to an electrode such that a corona discharge is generated between the electrode and the combustion chamber;

measuring a voltage and a current of a power source which powers the electrode;

controlling a power level provided to the electrode based on the measured voltage and current to sustain the corona discharge between the electrode and the combustion chamber, wherein the corona discharge provides sufficient energy to ignite the combustible gaseous mixture in the combustion chamber;

calculating an actual impedance from the measured voltage and current;

comparing the actual impedance to an impedance setpoint; and controlling the power level provided to the electrode to cause the actual impedance to substantially match the impedance setpoint.

35. An engine comprising:

a combustion chamber for containing a combustible gaseous mixture;

an electrode;

a power source which powers the electrode;

a current sensor which measures a current in the power source;

a voltage sensor which measures a voltage in the power source; and means for controlling a power level provided to the electrode based on the measured voltage and current to sustain a corona discharge between the electrode and the combustion chamber, wherein the corona discharge provides sufficient energy to ignite the combustible gaseous mixture.

36. The engine of claim 35, wherein the electrode provides radio frequency power to the combustion chamber with a frequency of between 30,000 and 3,000,000 hertz.

37. The engine of claim 35, wherein the engine is an internal combustion engine.

38. The engine of claim 35, wherein the engine is a gas turbine engine.

39. The engine of claim 35, wherein at least one of the electrode and the combustion chamber comprises a field enhancing device.

40. The engine of claim 35, wherein the power source powers an LC circuit having a resonant frequency, and the electrode is connected to an output of the LC circuit.

41. The engine of claim 35, wherein the means for controlling comprises a pulse width modulator which modulates a pulse width of an output signal from the power source.

42. The engine of claim 40, wherein the means for controlling controls an output frequency of the power source which drives the LC circuit.

43. An engine comprising:

a combustion chamber for containing a combustible gaseous mixture;

an electrode;

a power source which powers the electrode;

a current sensor which measures a current in the power source;

a voltage sensor which measures a voltage in the power source; and means for controlling a power level provided to the electrode based on the measured voltage and current to sustain a corona discharge between the electrode and the combustion chamber, wherein the corona discharge provides sufficient energy to ignite the combustible gaseous mixture, wherein the means for controlling a power level prevents the formation of a plasma and an electric arc in the combustion chamber.

* * * * *